United States Patent [19]

Case et al.

[11] Patent Number: 5,277,947
[45] Date of Patent: Jan. 11, 1994

[54] ADHESIVES FOR LAMINATING VINYL TO VARIOUS SUBSTRATES

[75] Inventors: Ronald B. Case, Newark, Del.; Robert J. Statz, Kennett Square, Pa.

[73] Assignee: E. I. Du Pont de Nemours and Company, Wilmington, Del.

[21] Appl. No.: 35,989

[22] Filed: Mar. 23, 1993

Related U.S. Application Data

[63] Continuation-in-part of Ser. No. 904,725, Jun. 26, 1992, Pat. No. 5,209,983.

[51] Int. Cl.⁵ .................. C09J 127/06; C09J 131/04; B32B 21/08; B32B 27/28
[52] U.S. Cl. .................................... 428/514; 428/518; 428/522; 525/208
[58] Field of Search ................ 525/208; 428/514, 518

[56] References Cited

U.S. PATENT DOCUMENTS

| | | | |
|---|---|---|---|
| 3,723,570 | 3/1973 | Adelman | 525/208 |
| 4,654,255 | 3/1987 | Kojima et al. | 428/518 |
| 4,724,186 | 2/1988 | Kelch | 428/514 |
| 4,731,504 | 3/1988 | Achille et al. | 428/518 |
| 4,774,146 | 9/1988 | Dehennau et al. | 428/518 |

Primary Examiner—Carman J. Seccuro, Jr.
Attorney, Agent, or Firm—Craig H. Evans

[57] ABSTRACT

Adhesives suitable for preparing laminates of polyvinyl chloride or polyvinyl chloride copolymers with wood or metal are prepared from a three component polymer mixture of polyvinyl chloride or its copolymers itself, a direct ethylene copolymer and another direct ethylene copolymer containing units derived from a monomer containing glycidyl units. The adhesive is especially useful for preparing PVC/wood laminates which are subject to outdoor weathering.

7 Claims, No Drawings

ADHESIVES FOR LAMINATING VINYL TO VARIOUS SUBSTRATES

CROSS REFERENCE TO RELATED APPLICATION

This application is a continuation-in-part of copending application Ser. No: 07/904,725 filed Jun. 26, 1992 now U.S. Pat. No. 5,209,983.

BACKGROUND OF THE INVENTION

1. Field of the Invention

This invention relates to adhesive compositions suitable for laminating polyvinyl chloride to wood or other substrates. The adhesives are blends of polyvinyl chloride and two different ethylene copolymers. The adhesive compositions are useful for preparing laminates which are suitable for outdoor use.

2. Description of Related Art

Adhesives are used in a wide variety of fields. For some applications the requirements of the adhesive may be very demanding. Not only must the composition provide good initial adhesion, but the adhesive bond may be subject to extremes of temperature or environment. Such is the case for adhesives used in outdoor building applications.

In the building industry, siding may be a laminate structure which requires an adhesive to make that laminate. That adhesive should be readily applied to the laminate components, it must adhere well to each of the layers of the laminate and the bonding must withstand the rigors of outdoor use. Common among siding materials are wood, metals and polyvinyl chloride.

Various materials are known for use as thermoplastic adhesives which may be applied in the melt as a molten fluid. If the viscosity of the melt is suitable for film extrusion, and cooled extruded film is stiff enough to handle, these copolymers may be adapted to films for laminating adhesives.

Various ethylene copolymers are well known as hot-melt thermoplastic adhesives. Ethylene/alkyl acrylate/carbon monoxide copolymers have been described for use as adhesives for use with a wide variety of substrates in PCT publication WO91/18043.

Ethylene vinyl acetate copolymers have long been known for use as hot-melt adhesives.

Ethylene butyl acrylate copolymers for use as hot-melt adhesives have been described in U.S. Pat. No. 4,816,306.

Ethylene/alkyl acrylate or vinyl acetate/carbon monoxide terpolymers have been disclosed for use especially as plasticizers for PVC in U.S. Pat. No. 3,780,140. Blends with PVC can be used as limp or rigid films. The terpolymers are disclosed alternately as being blendable with a large number of other materials, including epoxy resins.

None of the references disclose the particular three component combination of this invention, nor is there even any suggestion that blends of PVC with any ethylene copolymer or copolymers would be suitable as laminating adhesives.

There is a need for an adhesive material which provides good adhesion between polyvinyl chloride sheeting and various substrates, particularly wood, and which maintains that adhesion under outdoor weathering conditions.

SUMMARY OF THE INVENTION

The present invention provides for a thermoplastic adhesive for polyvinyl chloride (PVC) or its copolymers which is a blend of PVC itself or PVC copolymers with two distinct ethylene copolymer types, one of which contains a glycidyl group.

According to the present invention, there is provided an adhesive for PVC, comprising:

a) 5-56 weight percent of polyvinyl chloride or a polyvinyl chloride copolymer;

b) 15-75 weight percent of a first ethylene copolymer, said first copolymer being a direct copolymer containing 25-50 weight percent ethylene and from 75-50 weight percent vinyl acetate;

c) 2-25 weight percent of a second ethylene copolymer, said second copolymer being a direct copolymer containing from 0-50 weight percent of a moiety derived from at least one alkyl acrylate, alkyl methacrylate, alkyl vinyl ether, vinyl acetate or mixtures thereof where the alkyl radical contains 1-8 carbon atoms, and also containing 1-15 weight percent of a moiety derived from glycidyl acrylate, glycidyl methacrylate or glycidyl vinyl ether.

The first ethylene copolymer should not contain any glycidyl monomer units.

DETAILED DESCRIPTION OF THE INVENTION

In this disclosure, the word copolymer is used to embrace polymers with two or more monomers. If a distinction is necessary, the words 'bipolymer', 'terpolymer' etc. are used. The phrase 'direct copolymer' describes a copolymer made by polymerizing monomers together directly, rather than by adding a polymer chain onto an existing one by grafting on its monomer.

This invention concerns adhesives useful particularly for preparing laminates of polyvinyl chloride or copolymers to substrates such as wood or metal, particularly wood. Such adhesives will also be useful in other applications where adhesion to PVC and metal or wood is needed. The adhesive is thermoplastic, and is especially useful in the form of a film laminating adhesive.

Better adhesives generally have stronger adhesive bonds. Preferably the bonds should be as strong as the substrate so that failure is limited only by the cohesive strength of the substrate layers. If not as strong as the strength of the layers, the bond should at least be strong enough to hold up under use conditions.

It has now been found that superior adhesives for the present purpose are obtained by blending one type of ethylene copolymer with some PVC itself or PVC copolymer, together with a second ethylene copolymer type which contains a glycidyl group. The blend remain thermoplastic and melt-processible into films suitable for use as laminating adhesives.

It appears that all three components are necessary for this invention. Without limiting ourselves to a particular explanation, each component may especially help in a different way. Thus, while PVC obviously adheres to itself and hence enhances adhesion to the PVC film side of the laminate, it can provide versatility in achieving the best stiffness for a film laminate. Alone, PVC does not adhere to wood or other substrates well. The two ethylene copolymers are by contrast very flexible and so balance the laminate adhesive stiffness. Both may serve different adhesive functions. Thus, the glycidyl group reactively adheres to polar groups among others, and is essential to provide adhesion under moist conditions. However, the glycidyl containing ethylene copolymer is not very compatible with PVC and could not be used alone with PVC. The other ethylene copolymer, may serve a compatibilizing as well as an adhesive function.

The PVC in the blend may be the same PVC as the layer to be bonded or it may be another grade or a PVC copolymer. Typical copolymers suitable for this invention are copolymers of vinyl chloride with vinyl acetate, propylene, alkyl acrylate, vinylidene chloride, diethyl fumarate or diethyl maleate. PVC copolymers which have a lower melting point than the PVC to be laminated may be preferable. While the three-component blend adhesive softens at a lower temperature than the PVC itself, lower melting point PVC polymers may lower the temperature at which the adhesive blend may be prepared and applied.

The first ethylene copolymer is a copolymer of 15-75 weight percent ethylene and one, two or more monomers not including a glycidyl monomer. It is chosen so that it is essentially miscible with PVC. It will also be miscible with the second ethylene copolymer containing a glycidyl group. The other monomer consists of vinyl acetate or methyl acrylate. Terpolymers containing both comonomers are suitable. The particular comonomer and its amount must provide enough polarity for the copolymer to be miscible with PVC. The preferred copolymer is ethylene/vinyl acetate, and the preferred ethylene/vinyl acetate copolymer contains 55-70 weight percent vinyl acetate. Carbon monoxide and sulfur dioxide, preferably together with an alkyl acrylate, can also provide this polarity and this is the subject matter of copending application Ser. No. 07/904,725. Compatible terpolymers include ethylene/n-butyl acrylate/carbon monoxide or ethylene/ethyl acrylate/carbon monoxide.

The first ethylene copolymer should not contain any glycidyl monomer derived units, though small amounts of other monomers which do not affect the overall function of the copolymer in the adhesive are possible.

The second ethylene copolymer may have a comonomer which is selected from alkyl acrylates, methacrylates and vinyl acetate, and may by present in amounts up to about 50 weight percent. The second copolymer must have a comonomer containing a glycidyl group however. Such comonomers are glycidyl acrylate, glycidyl methacrylate and glycidyl vinyl ether. This monomer may be present at levels between 1 and 15 weight percent, preferably from 3-11 weight percent. The preferred second copolymers are terpolymers, and the preferred terpolymer is ethylene/n-butyl acrylate/glycidyl methacrylate containing from 10-40 percent n-butyl acrylate and 3-11 percent glycidyl methacrylate. Small amounts of other monomers which do not affect the overall function of this monomer in the adhesive composition are possible.

Both first and second ethylene copolymers are direct copolymers. They may be prepared by well known methods of free-radical, high-pressure polymerization. Preparative methods are given in U.S. Pat. Nos. 3,780,140 and 4,497,941. Both patents are herein incorporated by reference.

The amount of each of the three components of the adhesive can vary widely. The amount of PVC or PVC copolymer is designed to give the most suitable level of flexibility for the laminating adhesive for particular substrates, as well as the best balance of in-use adhesive behavior.

Very generally, more of the first ethylene copolymer than second ethylene copolymer is preferred. However, because adhesion is such a complex phenomenon, and particularly with regard to its permanence under end-use conditions, within the broad limits specified, wide variation is possible. It is within the skill of the artisan to vary levels to be most suitable for a particular environment and laminate structure.

In making a laminate of PVC or PVC copolymer with a wood or metal laminate co-layer, it is preferable to pre-treat the wood or metal substrate with a silane solution. This is a well known procedure and is particularly useful when the laminates are subject to a moist environment. Typical silanes for this purpose are amino-functional silanes, particularly amino trialkoxy silanes, for example aminotriethoxy silane.

Unlike typical hot-melt adhesives, this three-polymer-component blend adhesive does not require plasticizers, tackifiers, waxes and other common formulating additives which are often required to make adhesive formulations. The adhesive of this invention, however, is preferably used as a film, i.e. as a laminating adhesive, rather than being applied as a hot-melt, and as such requires sufficient 'body' to be used as a film at room temperatures. Small amounts of formulating additives, however, may be present to the extent that they do not detract from the overall utility of the adhesive. A formulated more fluid version of the three polymer adhesive blend however, applied as a hot-melt adhesive is possible.

On a large scale, it is possible to prepare the three component blend adhesive using typical extrusion equipment. Standard considerations with regard to adequate mixing and best blending the different viscosity components will be taken. In the laboratory, the three polymer component blend is preferably prepared by a 'masterbatch' and 'letdown' procedure. PVC is relatively stiff and high melting, while the ethylene copolymers are quite soft and lower melting. Blending all three components at the same time in the required amounts is possible, but it is easier to gradually 'soften' the PVC with some of the first copolymer, later adding the softened PVC/first copolymer masterbatch blend to the second ethylene copolymer, and if necessary more first ethylene copolymer, to achieve the final required amount of each component.

LABORATORY PREPARATION OF ADHESIVE BLENDS

PVC stabilizers which find standard use with PVC are added first. In the laboratory this may be done using a high speed Welex mixer to absorb the liquid stabilizers. The stabilizers are added to dry PVC in the mixer which is allowed to rotate at about 2500 RPM until the stabilizers are adsorbed, the temperature being allowed to rise to about 80° C. The blend is then cooled to about 60° C. with lower RPM and jacket cooling water, and then discharged from the mixer as a powder.

For blends containing more than 50 weight percent total ethylene copolymer a 50/50 masterbatch blend of PVC/first ethylene copolymer is made keeping the mixture PVC rich until fusion occurs. This blend can then be diluted with additional first and second ethylene copolymer until the desired blend ratio is obtained. To make the masterbatch, a Brabender or Haake high shear mixer is used. For the examples a batch size of about 280 g. was prepared. The temperature is set at 175° C., and the mixer set to have a rotation speed of about 100 RPM. The masterbatch is mixed, starting PVC rich, for about 5 minutes, then the remainder of the first copolymer is added, continuing mixing for another 10 minutes while the temperature is allowed to rise to just under 200° C. A gel-free blend is obtained. This masterbatch is then used with additional amounts of second and first ethylene copolymer as required to obtain the desired blend. In this 'letdown' step a smaller Brabender mixer is used, preparing batches of about 50 g. The temperature of the mixer is set at 180° C. and 100 RPM also. This mix is allowed to run for about 7 minutes and a maximum temperature of about 160° C. Gel-free blends are obtained. Scale up for commercial size preparations will be readily apparent from these lab scale preparative details.

LABORATORY LAMINATE PREPARATION PROCEDURE

Sheets of the adhesive being about 5 mil. thick are prepared in a conventional laboratory press using a temperature of about 180 ° C., cooling under pressure.

PVC/adhesive/wood laminates using the sheet adhesive are prepared as follows. A 2 inch×4 inch plywood strip is first cut. It is optionally treated with a silane solution. This is done by coating with a 0.4 weight percent solution of silane A1100 (aminotriethoxy silane manufacture by Union Carbide Corp.) in 50/50 water/isopropanol. The solution is then allowed to dry. An assembly of the plywood, film adhesive and PVC sheet (B. F. Goodrich 'Duracap' which is a semi-rigid vinyl sheet) is made. A strip of TEFLON film is inserted at the end of the assembly between the adhesive film and the PVC to prevent adhesion, so that when the laminate is placed in tensile tester, an unadhered portion of the PVC can be gripped for tensile testing. The test assembly is placed in a vacuum laminator which consists of a ¼"×9"×19" steel base plate having ¼" pipe connections for applying vacuum at each end. The plate edges contain a soft pliable sealant to seal the edges of KAPTON 5 mil. sheet which is used as a cover. A ⅜"×⅜" steel strip is placed over the KAPTON film on the sealing edge of the laminator and clamped evenly. The assembly is placed into a cool standard laboratory press and the press closed to just above the assembly without any pressure on it. Vacuum is applied to each pipe connection to pull the top sheet down firmly on the test assembly. The press is then heated to 180° C. over a period of about 7 minutes. It is found that using this time frame, the PVC, adhesive and wood is heated to a suitable temperature for adhesion, but does not reach the press temperature which would melt the PVC. Under different conditions, times will vary. The principle is to select a time and temperature to provide sufficient adhesion, yet not enough to allow the integrity of the vinyl film to be altered. The temperature reached by the adhesive is thus somewhat less than that which would distort the vinyl film. The heat is then turned off and allowed to cool to room temperature using cooling water. The vacuum is released and the laminated test sample removed from the laminator.

LAMINATE TESTING PROCEDURE

Laminates were tested as follows. The sample is placed in an Instron Tensile tester so that the PVC can be peeled from the wood substrate at an angle of 180°. The cross head of the tensile tester is run at 0.2 inches per minute. The average load and if possible the initial load required to peel the PVC is recorded and the mode of failure noted. The modes of failure may be (i) adhesive failure at the PVC adhesive interface, referred to the table as AD/PVC; (ii) adhesive failure at the wood adhesive interface—AD/WOOD and (iii) cohesive failure of the adhesive or even of the wood—COH. Where failure is both cohesive and adhesive, it is often difficult to discern the various effects. This is referred to as COH,AD.

PERFORMANCE TESTING

Several adhesive blends were made as described, used for preparation of laminates, and subjected to testing to determine the peel strength of the PVC/wood bond. The compositions and results are shown in Table I. In a second series of tests, several of the same adhesive blends were used but the laminates were subjected to a water soak to simulate a wet environment. The laminates were submerged in de-ionized water at 60° C. for about 24 hours. The samples were removed and dried at 60° C. under vacuum overnight. The samples were then subjected to peel strength tests in the same manner as for the UN-soaked laminates. In the samples subject to the water-soak, laminates were made in exactly the same manner as for laminates tested without a water-soak except that some laminates were made without silane treating the wood. This was designed to see how significant silane treatment was in maintaining laminate strength.

TABLE 1

STRENGTH OF PVC/WOOD LAMINATES

| SAMPLE | PVC WT % | COPOL 1 WT % | COPOL 2 WT % | PEEL STR. lbs/inch | FAIL MODE |
|---|---|---|---|---|---|
| A1S | 24 | 67 | 9 | 12.5 | AD/PVC |
| B1S | 19 | 71.3 | 9.7 | 12 | AD/PVC |
| C1S | 14 | 75.7 | 10.3 | 10.5 | AD/PVC |
| D1S | 0 | 87.8 | 12.2 | | BREAK |
| D1S* | SAME AS D1S | | | 7.5 | AD/PVC |
| E1S | 20.4 | 60.6 | 19 | 11.25 | AD/PVC |
| F1S | 22.2 | 63.8 | 14 | 11.7 | AD/PVC |
| G1S | 25.4 | 69.6 | 5 | 12 | COH |
| H1S | 26.5 | 71.5 | 2 | 13.25 | AD/WOOD |
| I1S | 27.2 | 72.8 | 0 | 12.5 | COH |
| J1S | 38.6 | 47 | 14.4 | 3.7 | AD/PVC &WOOD |
| K1S | 45.8 | 37 | 17.2 | 4.7 | COH,AD |
| L1S | 53.1 | 27 | 19.9 | 12.7 | COH,AD |
| M1S | 25.4 | 69.6 E/VA | 5 | 6.5 | COH |

All samples have had wood treated with silane.
*Repeat.
Sample codes such as C1S designate the laminate made with a given adhesive composition. The adhesive composition is C, 1 refers to the test condition (UN-soaked) and S means a silane treatment of the wood.
PVC is GEON-30 (B. F. Goodrich) for Samples A1S through L1S and for Sample M1S is a PVC copolymer with vinyl acetate comonomer and a m.p. of 130 deg. C., Grade KYHH mfg. by Keysor-Century Corp.
The PVC or PVC copolymer is first stabilized as described with 3.0% Mark 4710, a Barium/Zinc stabilizer manufactured by Witco div. of Argus Corp. and 5.0% ESO DRAPEX 6.8, an epoxidized soybean oil also manufactured by Witco.
COPOL 1 for Samples A1S through L1S is an ethylene/n-butyl acrylate/carbon monoxide terpolymer, MI 100, 63/27/10 weight ratio. For Sample M1S it is an ethylene/vinyl acetate copolymer containing 63 weight % vinyl acetate.
COPOL 2 for Samples A1S through L1S is an ethylene/n-butyl acrylate/glycidyl methacrylate terpolymer, MI 10.6, 63.6/28/8.4 weight ratio, and for Sample M1S is a terpolymer containing the same monomers, MI 12, 66.75/28/5.25 weight ratio.
Peel Strength values quoted actually represent a true peel strength where adhesive failure occurs. They represent some composite value of adhesive and cohesive strength where failure is not purely adhesive.

TABLE II
STRENGTH OF WATER-SOAKED PVC/WOOD LAMINATES

| SAMPLE MODE | PVC WT % | COPOL1 WT % | COPOL2 WT % | ADHESION lbs/inch | FAIL |
|---|---|---|---|---|---|
| C2 | | SAME AS C | | 4.8/2.75 | COH,AD/PVC& WOOD |
| C2S | | SAME AS C | | 7.8/6.0 | COH,AD/PVC& WOOD |
| D2S | | SAME AS D | | 6.2/6.2 | AD/PVC |
| E2 | | SAME AS E | | 6.0/1.2 | COH,AD/PVC& WOOD |
| E2S | | SAME AS E | | 8.5/8.5 | AD/PVC |
| L2 | | SAME AS L | | 5.2/1.0 | COH,AD/PVC& WOOD |
| L2S | | SAME AS L | | 8.0/8.0 | AD/PVC |
| G2 | | SAME AS G | | 1.6/1.6 | COH,AD/PVC& WOOD |
| G2S | | SAME AS G | | 3.9/3.3 | COH,AD/PVC& WOOD |
| I2 | | SAME AS I | | 1.1/1.1 | COH,AD/PVC& WOOD |
| I2S | | SAME AS I | | 1.9/1.9 | COH,AD/WOOD |
| M2S | | SAME AS M | | 7.0/6.0 | COH |

Compositions are given in Table 1. The number 2 refers to the second condition of laminate testing, after a water-soak.
Peel Strength values represent an initial strength, followed by a lower average value on continued peeling The data in Table 1 show that for a range of compositions containing the three components, strength of the laminates is high. Values above 3.0 are considered good. In many cases the adhesive bond exceeded the cohesive strength of the adhesive, and so failure occurred within the adhesive. Even when failure was at the PVC/adhesive or wood/adhesive interface however, that is to say adhesive failure, adhesive strength was high. Values are quite variable, probably because there are three possible modes of failure, or combinations of these, as discussed. Because of the variability in the data obtained it is difficult to say which composition represents a preferred one. It is currently believed that in end-use conditions, compositions which give only cohesive failure may be the preferred ones, though no data in actual end use conditions over a period of time are available.

Laminate D1S, which contained no PVC in the adhesive D, broke in one instance and gave no measurable strength. A repeat gave a strength of 7.5 lbs per inch. Although this value might be adequate, it is believed that when no PVC is present the adhesive bond may be unreliable, in addition to providing a film which is very flexible and difficult to handle. Compositions J1S and K1S gave adequate but relatively low strength values. Separate experiments suggest that in this triple component blend there are composition regions where miscibility of the three components is less. Such differences could explain the lower values.

While laminate I1S, containing no glycidyl containing copolymer in the adhesive blend, manifested a high strength of 12.5, its unsuitability showed up when subjected to a water-soak. Values in Table 2 are for laminates which have been soaked in water. Values for initial peel strength and also the average peel strength on continued peeling were determined. All strength values are much lower than when tested dry. This is because the strength of the wood is severly lowered by the water soak, so the values are strongly affected by this weakness. The initial values are probably more significant than values on continued peel, since this represents the threshold valued needed to cause adhesive failure.

In all cases, silane treatment of the wood gives higher failure values. As a result, it is preferred to pre-treat wood laminates when the laminates will be subject to a moist environment. Samples in Table 2 containing adhesive component I give very low values whether silane treated or not. This is the only sample which contained no glycidyl containing ethylene copolymer. It is clear that this component is needed when the laminate is subjected to a moist environment.

Sample M1S and M2S are for ethylene/vinyl acetate, having a high level of vinyl acetate, as Copolymer 1. Also in those samples Copolymer 2 has a lower level of glycidyl methacrylate and the PVC is a PVC copolymer having a lower melting point of about 130 compared with about 170 for Geon PVC. Results appear satisfactory, particularly after a water-soak. The results are not directly comparable with the rest of the samples in which Copolymer 1 is a terpolymer containing only 37 weight percent total comonomer including 10 weight percent carbon monoxide, since both Copolymer 2 and the PVC is different. However, it is clear that ethylene/vinyl acetate with a high level of vinyl acetate, which is a copolymer compatible with PVC, is quite satisfactory.

We claim:

1. An adhesive for polyvinyl chloride and polyvinyl chloride copolymers, comprising:
   a) 5-65 weight percent of polyvinyl chloride or a polyvinyl chloride copolymer;
   b) 15-75 weight percent of a first ethylene copolymer, said first copolymer being a direct copolymer containing 25-50 weight percent units derived from ethylene and 75-50 weight percent from vinyl acetate;
   c) 2-25 weight percent of a second direct ethylene copolymer containing from 0-50 weight percent units derived from a comonomer selected from the group consisting of alkyl acrylates, alkyl methacrylates, alkyl vinyl ether, and vinyl acetate, or mixtures thereof, where the alkyl radical contains 1-8 carbon atoms, and also containing 1-15 weight percent units derived from glycidyl acrylate, glycidyl methacrylate or glycidyl vinyl ether.

2. The adhesive of claim 1 wherein the second ethylene copolymer is ethylene/n-butyl acrylate/glycidyl methacrylate.

3. The adhesive of claim 2 wherein the second ethylene copolymer contains 10-40 weight percent units derived from n-butyl acrylate and 3-11 weight percent from glycidyl methacrylate.

4. The adhesive of claim 3 wherein the first ethylene copolymer contains 55-70 weight percent units derived from vinyl acetate.

5. A laminate comprising a polyvinyl chloride or a polyvinyl chloride copolymer layer, and a second layer, wherein the two layers are adhered with the adhesive of claim 1.

6. A laminate comprising a polyvinyl chloride or a polyvinyl chloride copolymer layer, and a second layer, wherein the two layers are adhered with the adhesive of claim 3.

7. The laminate of claim 5 wherein the second layer is wood.

* * * * *